US008307251B2

(12) United States Patent
Yamada

(10) Patent No.: US 8,307,251 B2
(45) Date of Patent: Nov. 6, 2012

(54) DATA PROCESSING DEVICE CAPABLE OF AUTOMATICALLY RETRANSMITTING DATA FILE DELETED FROM SERVER

(75) Inventor: Akihiro Yamada, Nagoya (JP)

(73) Assignee: Brother Kogyo Kabushiki Kaisha, Aichi-ken (JP)

( * ) Notice: Subject to any disclaimer, the term of this patent is extended or adjusted under 35 U.S.C. 154(b) by 515 days.

(21) Appl. No.: 12/554,125

(22) Filed: Sep. 4, 2009

(65) Prior Publication Data

US 2010/0083042 A1 Apr. 1, 2010

(30) Foreign Application Priority Data

Sep. 26, 2008 (JP) ................................ 2008-248593

(51) Int. Cl.
*H04L 1/18* (2006.01)
(52) U.S. Cl. ............ 714/748; 714/18; 714/57; 455/420; 358/1.15; 358/448; 358/1.13; 710/39; 709/206; 709/220; 709/204; 709/219; 709/224
(58) Field of Classification Search .................. None
See application file for complete search history.

(56) References Cited

U.S. PATENT DOCUMENTS

| 5,103,318 | A | 4/1992 | Takaoka | |
|---|---|---|---|---|
| 5,838,459 | A | 11/1998 | Hashimoto | |
| 7,301,658 | B2* | 11/2007 | Henry | 358/1.15 |
| 7,796,284 | B2* | 9/2010 | Someya | 358/1.15 |
| 2003/0084105 | A1* | 5/2003 | Wiley et al. | 709/205 |
| 2006/0129658 | A1* | 6/2006 | Kawai | 709/220 |
| 2006/0143286 | A1* | 6/2006 | Aoki et al. | 709/220 |
| 2006/0170964 | A1* | 8/2006 | Matsuda | 358/1.15 |
| 2006/0172730 | A1* | 8/2006 | Matsuda | 455/420 |
| 2006/0176509 | A1* | 8/2006 | Aoki et al. | 358/1.15 |
| 2006/0212527 | A1* | 9/2006 | Tonegawa et al. | 709/206 |
| 2006/0294421 | A1 | 12/2006 | Schneider | |
| 2008/0007755 | A1* | 1/2008 | Murakami et al. | 358/1.13 |
| 2008/0140730 | A1 | 6/2008 | Toshine | |

(Continued)

FOREIGN PATENT DOCUMENTS

EP 1 187 058 A2 3/2002

(Continued)

OTHER PUBLICATIONS

Japanese Official Action with translation dated Aug. 10, 2010.

(Continued)

*Primary Examiner* — John Trimmings
(74) *Attorney, Agent, or Firm* — Scully, Scott, Murphy & Presser, PC

(57) ABSTRACT

To facilitate retransmission of a data file that has been deleted from a server, a data processing device includes a first storage section in which a management table is stored. The management table includes a list of communication histories with respect to communications with each of the servers. Each communication history indicates a data file transmitted to the server. The device further includes a second storage section storing data files transmitted to the servers. A control section is provided for judging, when a communication section is in communication with a server, whether or not a data file which has already been transmitted to the server needs to be retransmitted and retransmit the data file to the server upon retrieving the data file from the second storage section when judgment is made so that retransmission of the data file is needed.

14 Claims, 7 Drawing Sheets

U.S. PATENT DOCUMENTS

| | | | |
|---|---|---|---|
| 2010/0039661 A1* | 2/2010 | Stephenson et al. | 358/1.15 |
| 2010/0115155 A1* | 5/2010 | Otsuka et al. | 710/39 |
| 2010/0131609 A1* | 5/2010 | Tonegawa et al. | 709/206 |

FOREIGN PATENT DOCUMENTS

| | | |
|---|---|---|
| FR | 2648657 | 12/1990 |
| JP | 7-221960 A | 8/1995 |
| JP | 2004-120259 | 4/2004 |
| JP | 2005-165730 | 6/2005 |
| JP | 2006-25137 | 1/2006 |
| JP | 2006-157861 A | 6/2006 |
| JP | 2007-11812 | 1/2007 |
| JP | 2007-311858 * | 11/2007 |
| JP | 2007-311858 A | 11/2007 |
| JP | 2008-135870 | 6/2008 |
| JP | 2008-135870 * | 8/2008 |

OTHER PUBLICATIONS

Extended European Search Report dated Jan. 29, 2010.

Chinese Office Action dated Mar. 26, 2012 from related Chinese Application No. 200910178516.4, together with an English language translation.

* cited by examiner

FIG. 7A

| HISTORY | SERVER NAME | ACCOUNT | PASSWORD | FILE NAME | ART | HOLDING TIME PERIOD | TRANS. DATE/TIME |
|---|---|---|---|---|---|---|---|
| 1 | SERVER 1 | test1 | test1test1 | aaa.jpg | EXPIRED | 1 HOUR | 2008/08/05: 13:00 |
| 2 | SERVER 2 | test2 | test2test2 | gazo.jpg | ORDINARY | – | 2008/08/06: 10:30 |
| 3 | SERVER 1 | test3 | test3test3 | temp.pdf | AUTO | 10 HOURS | 2008/08/06: 17:00 |
| 4 | SERVER 3 | test4 | test4test4 | bbb.tif | AUTO | 0.5 HOUR | 2008/08/06: 21:40 |

FIG. 7B

FILE NAME: retransmission

Server: Server1
User: test1
Dir: aaa.jpg
REQUEST FOR RETRANSMISSION

DATA PROCESSING DEVICE CAPABLE OF AUTOMATICALLY RETRANSMITTING DATA FILE DELETED FROM SERVER

CROSS REFERENCE TO RELATED APPLICATION

This application claims priority from Japanese Patent Application No. 2008-248593 filed Sep. 26, 2008. The entire content of this priority application is incorporated herein by reference.

TECHNICAL FIELD

The present invention relates to a network system including a server, a personal computer, and a data processing device, in which data files uploaded from the data processing device to the server can be shared by the personal computer.

BACKGROUND

Conventionally, it has been known to share data files existing in a server with a plurality of parties. This can be done by, for example, uploading data files to a server through a network and personal computers connected to the server are allowed to access to those data files. However, re-uploading a data file to the server becomes necessary in the event that the data file once uploaded to the server is accidentally deleted. Generally, re-loading the data file is troublesome because the data file may not be retained in a client device from which the data file is uploaded.

SUMMARY

In view of the foregoing, it is an object of the present invention to provide a data processing device that facilitates retransmission of a data file that has been deleted from a server.

In order to achieve the above and other objects, there is provided a data processing device including a communication section, a first storage section, a second storage section, and a control section. The communication section is configured to be connectable to and communicable with one or more servers through a network. The first storage section stores a management table having a list of communication histories with respect to communications with each of the one or more servers. Each communication history indicates a data file transmitted to a server. The second storage section stores data files transmitted to one or more servers. The control section is configured to judge, when the communication section is in communication with a server, whether or not a data file which has already been transmitted to the server needs to be retransmitted and retransmit the data file to the server upon retrieving the data file from the second storage section when judgment is made so that retransmission of the data file is needed.

BRIEF DESCRIPTION OF THE DRAWINGS

The particular features and advantages of the invention as well as other objects will become apparent from the following description taken in connection with the accompanying drawings, in which:

FIG. 7A is an explanatory diagram illustrating one example of an execution history management table; and FIG. 7B is an explanatory diagram illustrating one example of retransmission file.

DETAILED DESCRIPTION

Next, an embodiment of the present invention will be described with reference to the accompanying drawings.

Figure 1:
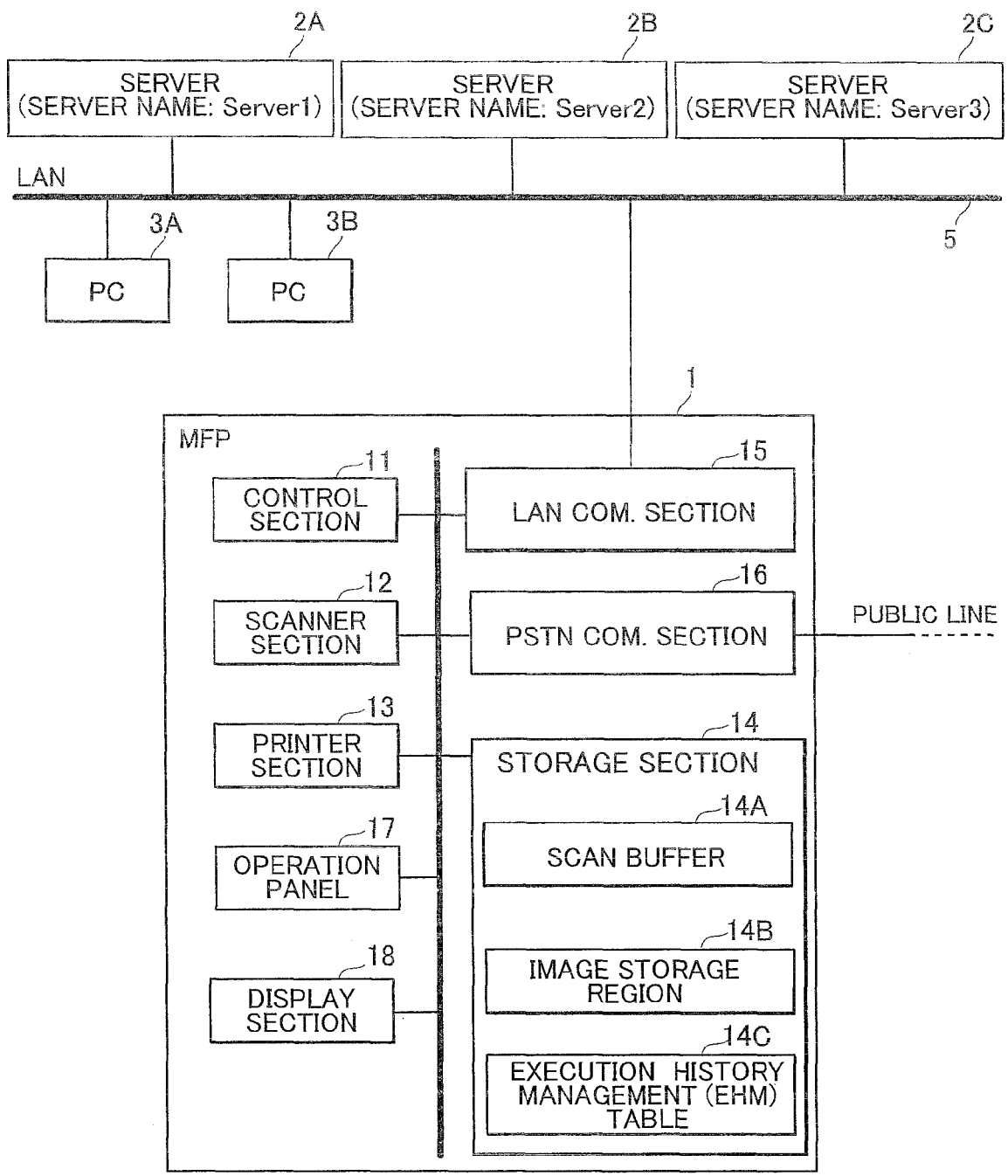
FIG. 1 is a block diagram showing an arrangement of a network system to which the present invention is applied.

The network system shown in FIG. 1 includes a multifunction peripheral (hereinafter, abbreviated as "MFP") 1, servers 2A, 2B and 2C, and personal computers (hereinafter, abbreviated as "PCs") 3A and 3B, all of which are communicably connected to one another via a LAN (Local Area Network) 5. This system is configured so that image data can be transmitted or uploaded from the MFP 1 to all or some of the servers 2A to 2C. The server to which the image data is transmitted from the MFP 1 will be referred to as a selected, destined or designated server in the following description.

The MFP 1 is a versatile device having a scanner function, a printer function, a copier function, a facsimile transmission/reception function, a telephone function, and a network communications function. The MFP 1 includes a control section 11, a scanner section 12, a printer section 13, storage section 14, LAN communication section 15, PSTN communication section 16, operation panel 17 and display section 18. The MFP 1 further includes a "Scan-to-FTP" function. The "Scan-to-FTP" function means a function capable of uploading image data created by the scanner function to one or more designated servers, which may be the servers 2A, 2B and 2C in this embodiment, using the network communications function.

When the image data is uploaded, the MPF 1 serves as an FTP client and transmits image data to the server 2A, 2B or 2C serving as FTP servers. That is, a software is installed in the MFP 1 for making the MFP 1 to act as an FTP client. To enforce the "Scan-to-FTP" function, the control section 11 executes controls of both the scanner function and the FTP client function in an interlocking relation with each other.

The scanner section 12 has an image sensor that is capable of optically reading images of an object. When the "Scan-to-FTP" function is executed, the scanner section 12 reads images and creates image data for uploading. The storage section 14 has a scan buffer 14A, image storage region 14B and an execution history management table (hereinafter referred to as "EHM table") 14C. The scan buffer 14A is configured of a RAM (Random Access Memory) in this embodiment, which temporarily stores image data created by the scanner section 12. The image storage region 14B is configured of a HDD (Hard Disc Drive) in this embodiment but can be a large-capacity non-volatile memory. The image storage region 14B is provided for storing image data subject to retransmission to the designated server when the "Scan-to-FTP" function is executed. The EHM table 14C is a storage area preserved in the HDD or the large-capacity non-volatile memory for storing execution history recorded whenever the "Scan-to-FTP" function is executed.

The LAN communication section 15 is configured of a communication interface for connecting to the LAN 5. By virtue of the LAN communication section 15, a file is transmitted to the server 2A, 2B or 2C through the LAN 5 when the "Scan-to-FTP" function is executed. In the network system described above, image data uploaded to the servers 2A, 2B or 2C using the "Scan-to-FTP" function of the MFP 1 can be accessed by the client PCs 3A and 3B.

The PCs 3A and 3B can arbitrarily download or delete image date which has ever been uploaded to the servers 2A, 2B and 2C. As such, a problem may arise such that the user of the PC 3B accidentally deletes the uploaded image data despite the user of the PC 3A is intended to later access to the same image data. Even when such a problem occurs, the MFP 1 automatically retransmits the same image data to the server 2A, 2B or 2C as will be described below.

Next, transmission/retransmission process of the image data by the MFP 1 will be described while referring to the flowcharts shown in FIGS. 2 to 5. The "Scan-to-FTP" process is shown in FIGS. 2 to 5 which are executed together with other processes when the MFP 1 is powered. Note that the process of the flowcharts shown in FIGS. 2 to 5 is executed by the control section 11 of the MFP 1. The examples shown in FIGS. 2 to 5 are directed only to the process relating to "Scan-to-FTP" function to be executed by the MFP 1, although the MFP 1 can execute other processes when powered.

When the MFP 1 is powered, the MFP 1 first executes the "Scan-to-FTP" process (S105). Details of the "Scan-to-FTP" process are shown in FIG. 3.

Figure 3:
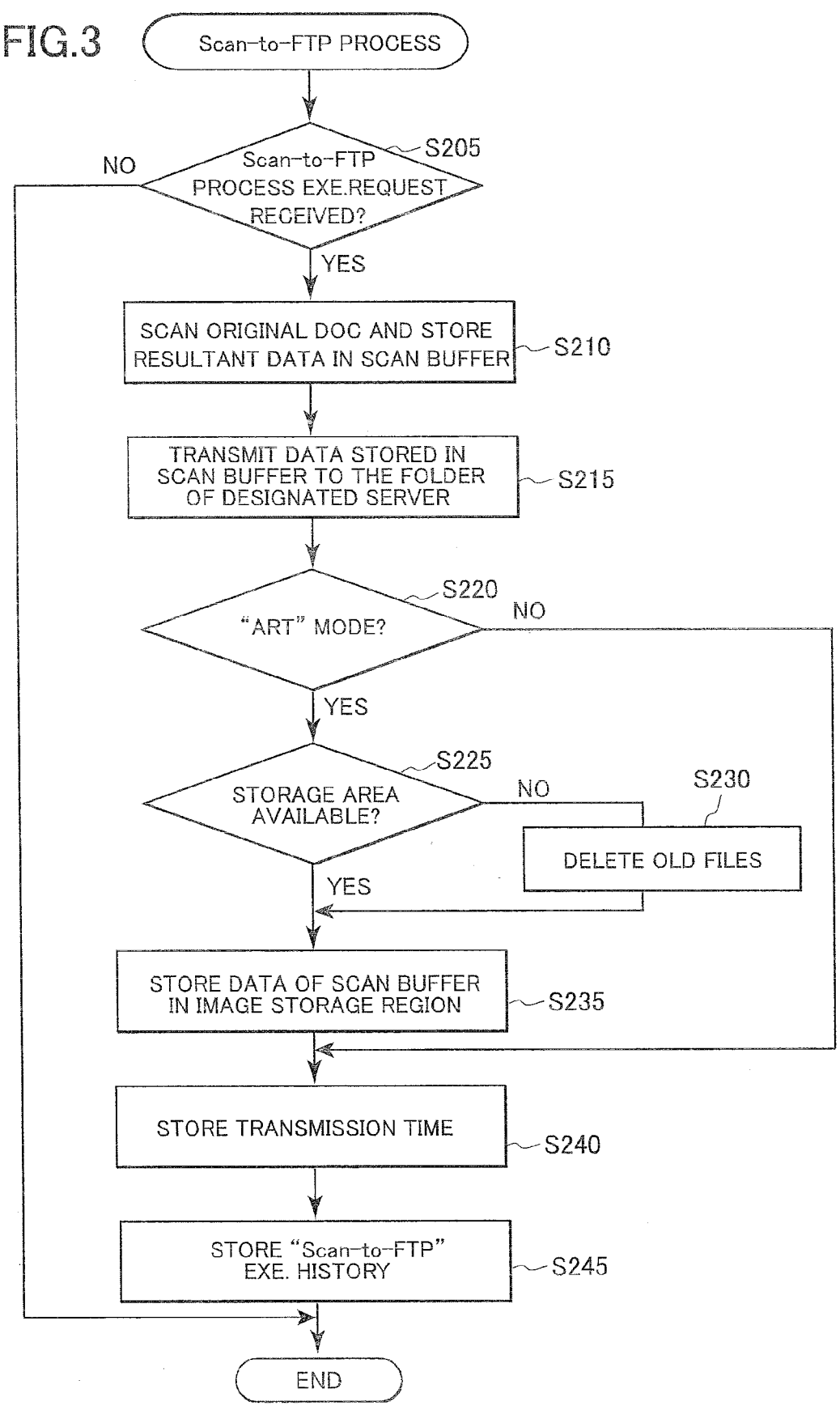
FIG. 3 is a flowchart illustrating a Scan-to-FTP process according to the embodiment of the invention.

In the flowchart shown in FIG. 3, when the "Scan-to-FTP" process is commenced, the control section 11 judges whether or not a request for execution of the "Scan-to-FTP" process has been received (S205). Determination as to whether or not the request for execution of the "Scan-to-FTP" process has been received is made based on a prescribed input operation manipulated by a user. For example, depression of a prescribed key on the operation panel 17 can trigger the execution of the "Scan-to-FTP" process. Commencement of the "Scan-to-FTP" process places the MFP 1 in a parameter inputting mode for inputting parameters relating to the "Scan-to-FTP" process.

Figure 6:
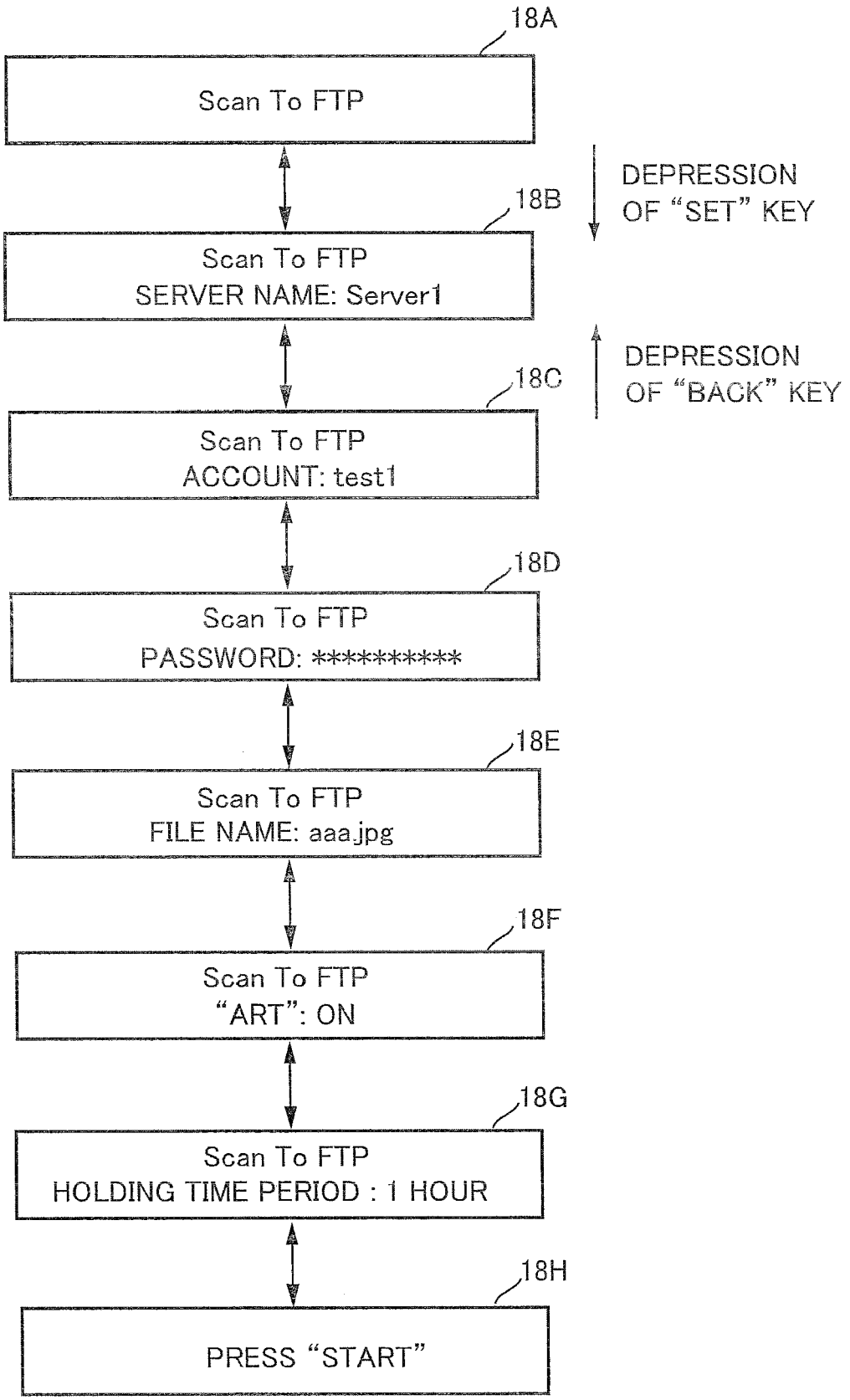
FIG. 6 is an explanatory diagram illustrating change of display screen at the time of setting parameters.

In the parameter inputting mode, the display section 18 sequentially displays the contents of parameters from 18A to 18H as shown in FIG. 6. The MFP 1 first displays the content 18A to thereby notify the user that the "Scan-to-FTP" function has been selected. Then, by successively or continuously depressing, for example, a "SET" key on the operation panel 17, the user can check the contents of other parameters sequentially from 18B to 18H. The contents of parameters can be displayed in a reversed order from 18H to 18A by the depression of a "BACK" key on the operation panel 17.

The contents of parameters 18B to 18H indicate a name of destined server, an account for accessing to the destined server; a password for authentication to gain access to the destined server, a file name to be created in the destined server, an ON/OFF setting to an automatic retransmission mode (to be described later), and a holding period of time for keeping the automatic retransmission mode in force.

The contents set by the user to the above parameters are stored in a profile and the contents contained in the profile are displayed as initial settings. If the initial settings are acceptable as they stand, all the user has to do is confirming the displayed contents.

On the other hand, when the user wants to change a part or whole of the contents of parameters displayed as initial settings, the user can change the contents of parameters through input operation on the operation panel 17. By doing so, customization can be achieved. For example, a server that has not been registered in the profile can be set as a destined server, the file to be created in the destined server can be renamed, and the automatic retransmission mode can be changed from ON to OFF or vice versa.

Upon checking the displayed contents 18B to 18G and confirming that the settings are in order, a "START" key on the operation panel 17 is depressed in a state in which the content 18H is displayed. In response to the depression of the "START" key, S205 in the flowchart of FIG. 3 determines that the request for execution of the "Scan-to-FTP" process has been received.

When determination is made so that the request for execution of the "Scan-to-FTP" process has been received (S205: YES), the MFP 1 scans an original document and image data of the original document is stored in the scan buffer 14A (S210). Then, the data stored in the scan buffer 14A is transmitted to a designated folder in a designated server (S215). In this embodiment, either one of the servers 2A to 2C is designated as a destined server.

In S215, the log-in process to the server designated in the parameter content 18B is performed using the associated account and password. The account to be used is displayed in the parameter content 18C. The password is displayed with a chain of star marks in the parameter content 18D but is applicable. The image data stored in the scan buffer 14A is uploaded to the destined server designated in the parameter content 18B using an FTP (File Transfer Protocol) as one of communication protocols. As a result, the image data with a file name designated in the parameter content 18E (in this embodiment aaa.jpg) is stored in the storage area of the destined server.

After completion of the process in S215, the MFP 1 further judges whether or not the automatic retransmission (ART) mode has been set (S220). The "ART" mode is a mode for uploading a file to the server from the MFP 1 when the same file previously uploaded to the same server has been deleted for some reasons despite the file holding period of time has not yet been expired.

Whether or not the "ART" mode is used in conjunction with an uploading file can be set on a file-to-file basis. Set condition of the "ART" mode can be confirmed from indication of ON or OFF in the content of parameter 18F.

In S220, when the "ART" mode is set (S220: YES), judgment is made as to whether or not there remains a vacant storage area in the image storage region 14B (S225). This judgment is necessary to check if a data file that may be necessary to later upload to the server can be stored in the image storage region 14B. The judgment in S225 is made by the comparison of the size of data file stored in the scan buffer 14A with the size of vacant storage size in the image storage region 14B.

When a sufficient amount of storage area does not remain in the image storage region 14B (S225: NO), one or more old data files are deleted or erased from the image storage region 14B (S230). Specifically, judging from the time/date stamped to each data file, the oldest file is deleted one after another until an available storage area of the scan buffer 14A can be preserved.

When the image storage region 14B has a sufficient vacant storage area (S225: YES) or has preserved the storage area for storing the data file in the scan buffer 14A (S230), the data file in the scan buffer 14B is stored in the image storage region 14B (S235).

Upon completion of the process in S235 or when the judgment in S220 reveals that the "ART" mode has not been set (S220: NO), the control section 11 stores the transmission time (S240) and also stores an execution history of the "Scan-to-FTP" process (S245). In S240 and S245, an execution history is stored in the EHM table 14C as shown in FIG. 7A.

Specifically, the EHM table 14C records execution histories each including items of server name, account, password, file name, "ART", holding period of time, and transmission date/time. One set of execution history is newly recorded in the EHM table 14C whenever the "Scan-to-FTP" process is executed. The EHM table 14C in FIG. 7A shows four sets of execution histories consecutively numbered from 1 to 4.

Among the seven items, the transmission date/time is a column to write year, month, date and time when the "Scan-to-FTP" process is executed. Data entry of the actual date into the column of the transmission date/time is performed during the execution of S240. Data entries regarding the server name, account, password, file name, "ART", and holding time period are performed based on the contents of parameters 18B to 18G shown in FIG. 6 during the execution of S245.

When the "ART" mode is set ON, the item of "ART" is indicated "AUTO" whereas the "ART" mode is set OFF, the item of "ART" is indicated "ORDINARY". When the holding period of time for holding the data file has been expired, the corresponding column is rewritten from "AUTO" to "EXPIRED" as will be described in detail in connection with the process in S335.

Figure 2:
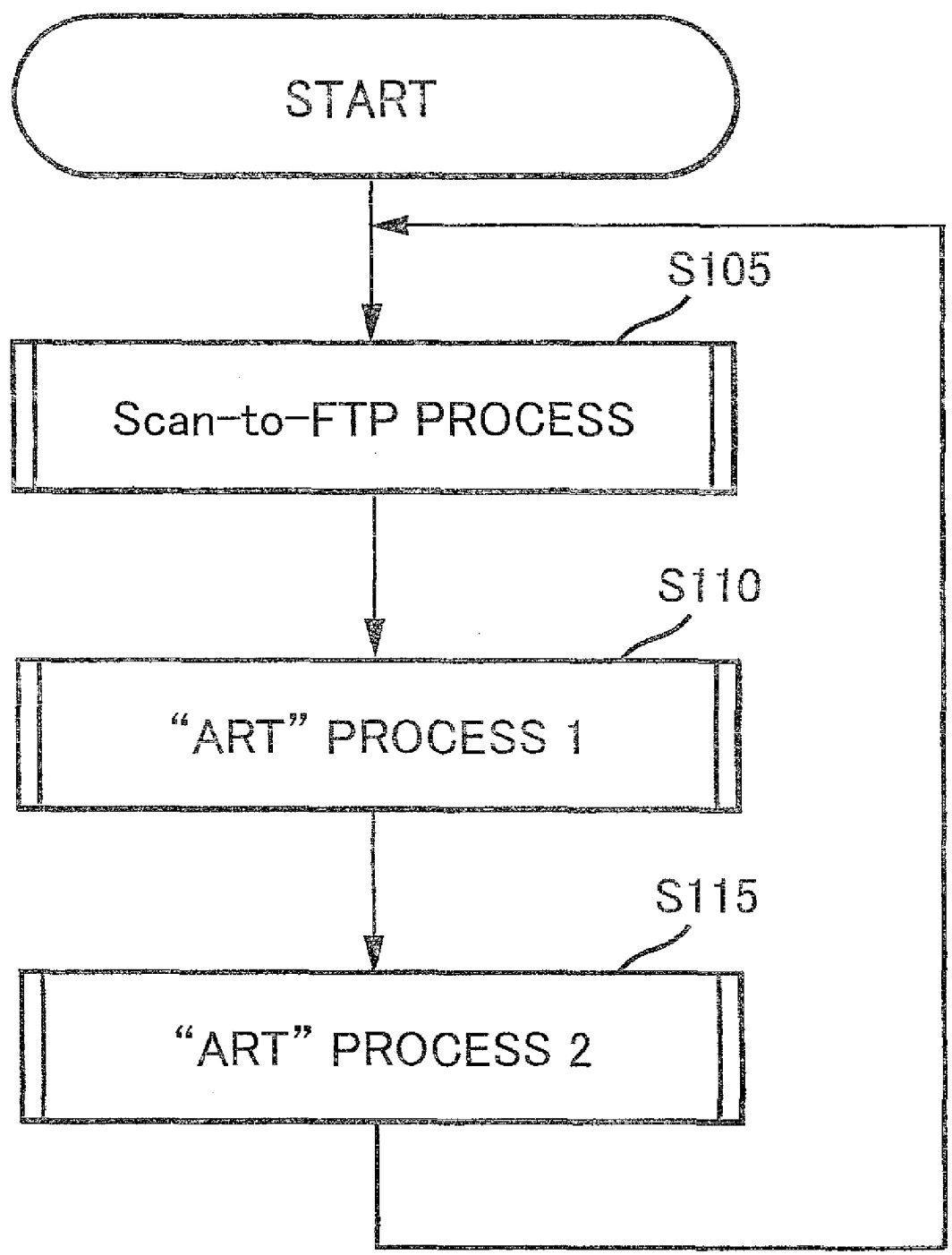
FIG. 2 is a flowchart illustrating a transmission/retransmission process of image data executed by a multifunction peripheral (MFP) according to one embodiment of the invention.

Upon completion of the process in S245 or when determination is made in S205 so that the "Scan-to-FTP" execution request has not been received (S205: NO), the "Scan-to-FTP" process shown in FIG. 3 is ended. That is, the "Scan-to-FTP" process in S105 of the flowchart shown in FIG. 2 is ended. Subsequently, the MFP 1 executes an "ART" process 1 (S110). Details of the "ART" process 1 are illustrated in the flowchart of FIG. 4.

Figure 4:
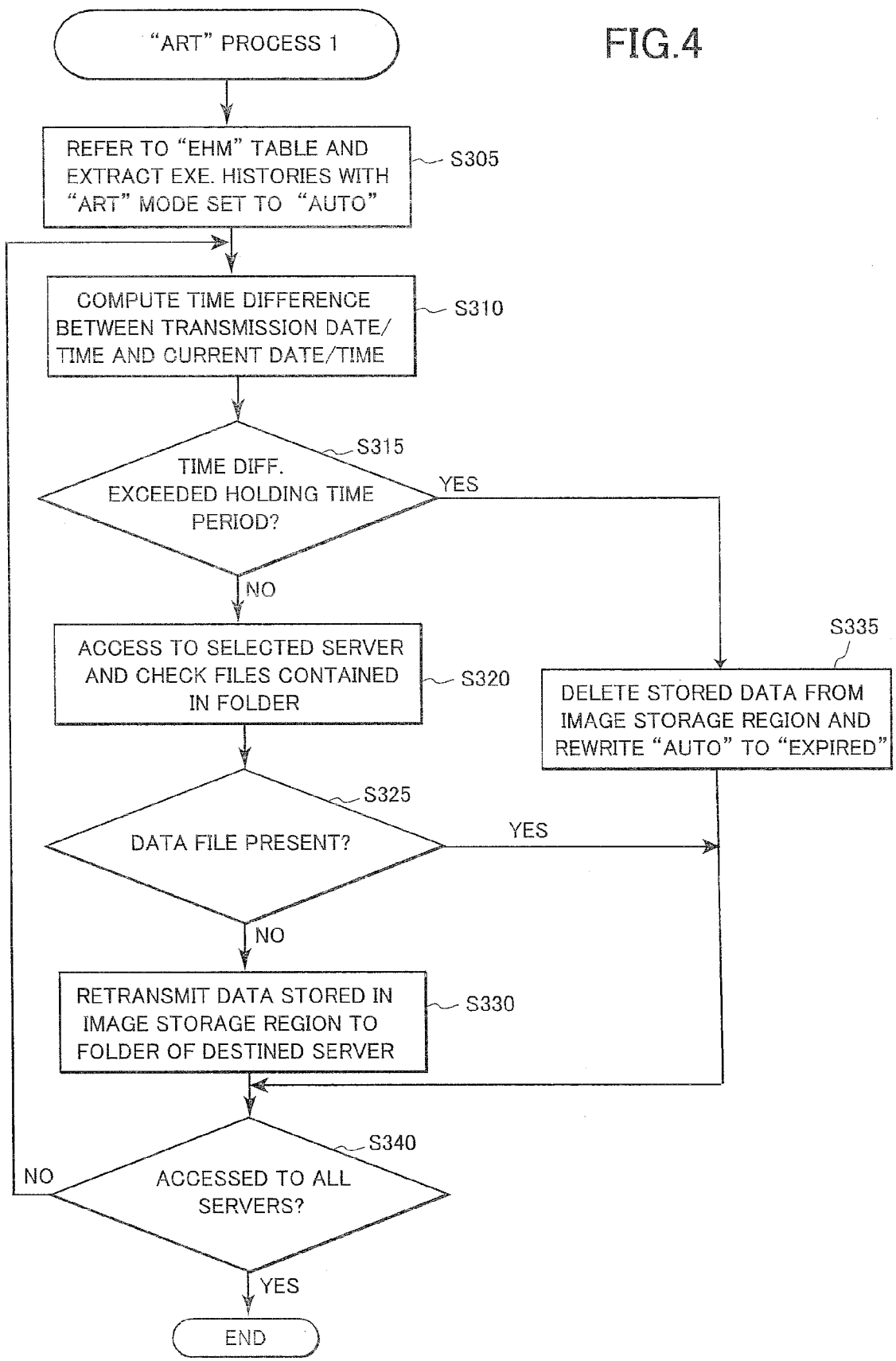
FIG. 4 is a flowchart illustrating an automatic retransmission (ART) process 1 according to the embodiment of the invention.

Referring to the flowchart shown in FIG. 4, when the "ART" process 1 is commenced, the MFP 1 refers to the EHM table 14C and extracts execution histories (communication histories) in which the "ART" mode is set to "AUTO" (S305). In the EHM table 14C shown in FIG. 7A, the execution histories 3 and 4 are extracted.

With respect to the extracted execution histories, the control section 11 computes a time difference between the transmission date/time and the current date/time for each execution history (S310) and judges whether or not the computed time difference exceeds the holding period of time (S315). When it is determined in S315 that the computed time difference does not exceed the holding period of time (S315: NO), the MFP 1 gains an access to the selected server and checks the data files contained in a prescribed folder (S320).

Next, in S325, judgment is made as to whether or not the data file as checked in S320 is present (S325). If data that was uploaded from the MFP 1 to, for example, the server 2A is deleted for some reasons, determination is made in S325 that the data file in question is not present (S325: NO). In this case, the MFP 1 retransmits the data file stored in the image storage region 14B to the prescribed folder of the server 2A (S330). Thus, the data that was deleted from the server 2A can be recaptured.

When the data file uploaded from the MFP 1 to the server is not deleted, it is determined in S325 that the data file is present in the server (S325: YES). When it is the case, the process in S330 is not executed. On the other hand, when the computed time difference exceeds the holding period of time (S315: YES), the control section 11 deletes the data in question from the image storage region 14B and rewrites the column of "ART" from "AUTO" to "EXPIRED" (S335). In the EHM table 14C shown in FIG. 7A, the execution history 1 corresponds to the rewritten case. The execution history 1 was originally set to "AUTO" in the column of "ART" at the time when the history was recorded. However, when the computed time difference exceeds the holding period of time (one hour in this case), the "ART" is rewritten to "EXPIRED" from "AUTO" in the process of S335.

By rewriting or updating the status of column of "ART", the execution history in which "AUTO" is rewritten to "EXPIRED" is not subject to extraction in S305 and the processes in S310 et seq. are not applied to such execution history.

Upon execution of S330 or S335, it is judged whether or not the control section 11 has accessed to all of the servers associated with the execution histories extracted in S305 (S340). If there are servers that remain unaccessed, the decision made in S340 become negative (S340: NO) and the routine returns to S310. On the other hand, when it is determined that the MFP 1 has accessed to all of the servers (S340: YES), the "ART" process 1 is ended. This means the end of the process of S110 in the flowchart of FIG. 2. Subsequently, the MFP 1 executes the "ART" process 2 (S115). Details of the "ART" process 2 are illustrated in the flowchart of FIG. 5.

Figure 5:
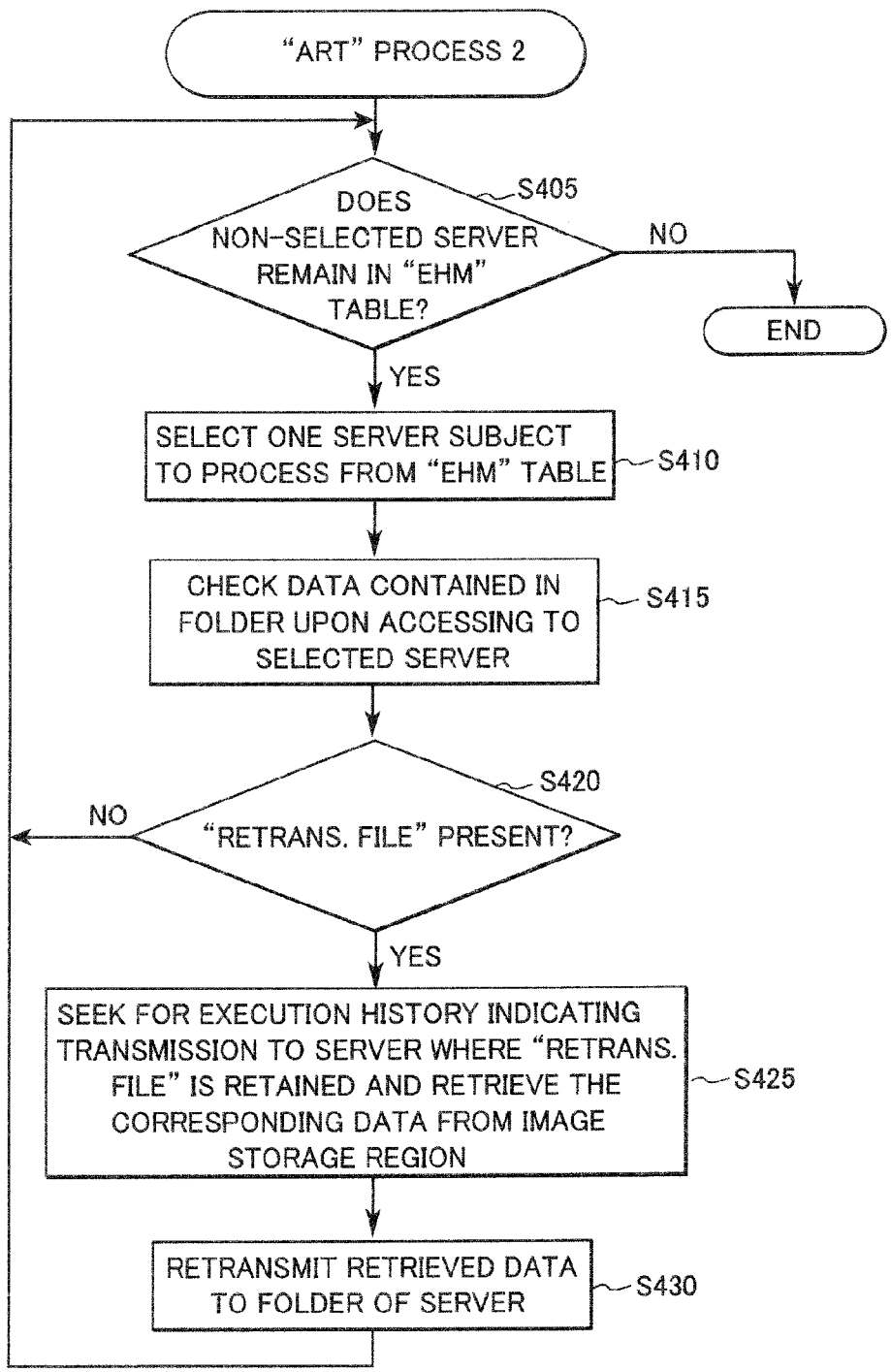
FIG. 5 is a flowchart illustrating an automatic retransmission (ART) process 2 according to the embodiment of the invention.

Referring to FIG. 5, when the "ART" process 2 is commenced, the control section 11 judges whether or not there remains unselected server in the EHM table 14C (S405). It should be noted that the control section 11 selects each of all the servers recorded in the EHM table 14C once. If there remains unselected server (S405: YES), the control section 11 selects a server to be processed from the EHM table 14C (S410). That is, one of the servers which remains unselected is selected as a subject for process. The control section 11 accesses to the selected server, checks the data files contained in the folder (S415), and judges whether or not the folder contains a "retransmission file" (S420). The "retransmission file" searched in S420 is a special file that requests the MFP 1 to retransmit to the server the data file identified in the "retransmission file".

As shown in FIG. 7B, the "retransmission file" is in a predetermined format and in a form of a text file containing descriptive characters. Specifically, in this embodiment, the "retransmission file" describes the server name, user name, folder name (or directory name), and a character string reading "Request for Retransmission". These four pieces of information are given in the stated order on different lines by entering a line feed after entry of one piece of information. In the example shown in FIG. 7B, the server 1 is designated by the user whose name is "test1", and the file named "aaa.jpg" is designated as a file subject to retransmission to the server 1. Two or more files may be designated on the same "retransmission file". This can be done, for example, by listing another file name aside the firstly listed file name while connecting these two files with a symbol "+", i.e., "Dir:aaa.jpg+bbb.jpg". Also, the "retransmission file" can be used in common by plural users. In such a case, the user names can be listed one after another while interposing a symbol of, for example, semicolon between the users.

The "retransmission file" can be created by the PC 3A or 3B connected to the LAN 5 or the MFP 1. The "retransmission file" thus created is uploaded to a prescribed folder of the server identified in the "retransmission file". The "retransmission file" can be uploaded to the server concurrently with or separately from the data file and also can be deleted at any time.

The MFP 1 may store a "retransmission file" format to allow the user to modify it using the operation panel 18. Insertion of the server name, user name and/or folder name (directory name) into the "retransmission file" format can complete the "retransmission file". The "retransmission file" thus produced is transmitted to the destined server on an as-needed basis.

Judgment is made in S420 that the "retransmission file" is present in a selected server. If the "retransmission file" does not exist in the server or the file is not of the predetermined format even if the file name is "retransmission file", judgment made in S420 is that the "retransmission file" is not present.

When the decision made in S420 indicates that the "retransmission file" is present (S420: YES), the control section 11 seeks for the execution history indicating transmission to the server where the "retransmission file" is retained. The control section 11 then retrieves the corresponding data file from the image storage region 14B (S425). The data file identified in the "retransmission file" may not be stored in the image storage region 14B in case where plural users use the same "retransmission file". In such a case, the data file not stored in the image storage region 14B will, of course, not be retransmitted but only the data existing in the image storage region 14B is retransmitted to the prescribed folder of the server (S430).

The process executed in S430 uploads the data file stored in the image storage region 14B to the destined server. Hence, the server can recapture the deleted file. If the "retransmission file" is present in the server despite the fact that the data file to be uploaded is not deleted but present, the data file is nevertheless uploaded and overwritten over the data file existing in the server. The process in S430 may be modified so as not to upload the data file if the same data file is exiting in the server. Otherwise, the process in S430 may be modified to allow the user to select either one of overwrite or stop uploading.

Upon completion of the process in S430 or when the judgment made in S420 indicates that the "retransmission file" does not exist (S420: NO), the routine returns to S405. Insofar as the judgment made in S430 indicates that there remains unselected servers (S405: YES), the processes S405 to S430 are repeatedly carried out until all the servers are selected. When judgment is made so that all the servers have selected (S405: NO), the "ART" process 2 is ended. This means that the process in S115 in the flowchart of FIG. 2 is ended. As a result, the routine in the flowchart of FIG. 2 returns to S105 and the processes in S105, S110 and S15 are repeatedly carried out.

As described above, in S235 in the flowchart shown in FIG. 3, the MFP 1 stores data files in the image storage region 14B as retransmission candidate data and judges whether or not retransmission of the retransmission candidate data needs to be performed in S325 in the flowchart of FIG. 4 or S420 in the flowchart of FIG. 5. When judgment indicates that the retransmission needs to be carried out, the retransmission candidate data is transmitted to the relevant server. Accordingly, when the retransmission candidate data needs to be retransmitted, the user can easily retransmit the retransmission candidate data to the server without taking troublesome and intricate procedure. That is, the user may not scan and read an object once again to produce the same data file which was previously uploaded to the server.

Particularly, in S325, if the data file is deleted from the server, the MFP 1 makes a decision to retransmit the same data file to the server even if the user is not instructed to do so. On the other hand, in S420, regardless of whether or not the data file is deleted from the server, the "retransmission file" created by the user and placed in the server causes the MFP 1 to retransmit the data file. Using selective one of the above-described retransmission methods, retransmission of the data file to the server can be readily achieved.

The MFP 1 can register in the EHM table 14C an optional choice as to whether or not the automatic retransmission is to be performed. This registration can be made for each data file. In S305 of the flowchart in FIG. 4, the data files subject to automatic retransmission are extracted before retransmission. Hence, it is highly effective in that only the necessary data files can be retransmitted unlike the case in which all the data files are retransmitted. Further, extraction of the retransmission candidate data in S305 does not require an instruction as to whether or not the retransmission needs to be performed. Accordingly, the user is free from troublesome operations to achieve the same results.

The MFP 1 can retransmit the data files to the server if the holding period of time for holding the previously uploaded data has not yet been expired. However, expiration of the holding period of time makes the retransmission candidate data invalid and retransmission of the retransmission candidate data is no longer possible. Therefore, judgment as to whether or not the old data file needs to be retransmitted is not performed in the processes after S310 if the holding period of time of the data file has been expired. This lessens the load imposed on the MFP 1 and the network.

In S335 of the flowchart of FIG. 4, data file that is not subject to automatic retransmission is deleted. Accordingly, the storage space in the image storage region 14B can be effectively utilized. The user is not obliged to perform routine actions for keeping the image storage region 14B in an available state. Further, the retransmission candidate data is not retained in the image storage region 14B for an indefinite time but deleted when the data file is no longer necessary. The user may not positively perform deletion of the data manually. Hence, leakage of secrecy, which may occur if the data is not deleted, can be prevented.

In S230 of the flowchart shown in FIG. 3, the control section 11 deletes old data files if the image storage region 14B does not have sufficient storage space for storing newly created retransmission candidate data. Accordingly, new retransmission candidate data, which may have a higher priority than the old data file in terms of necessity for retransmission, can be stored in the image storage region.

While the invention has been described in detail with reference to the embodiments thereof, it would be apparent to those skilled in the art that various changes and modifications may be made therein.

In the above-described Scan-to-FTP process (S105), only the image data set to ON with respect to automatic retransmission is subject to retransmission and is stored in the image storage region 14B in the processes of S220 and S235. Provided that the storage capacity of the image storage region 14B is sufficiently large, all pieces of image data may be stored in the image storage region 14B regardless of whether the automatic retransmission is set to ON or OFF. In this modification, the "ART" process 2 (S115) in the flowchart of FIG. 2 can be modified to deal with all the data files as the retransmission candidate data.

While all the data files are stored in the image storage region 14B, only the data file with a setting of "ON" with respect to the automatic retransmission may be dealt with as the retransmission candidate data. Accordingly, with such a configuration, if the data file that should not be deleted from the server can be identified, retransmission of such a data file can be accomplished simply by setting the "ART" of such data file to "ON" or "AUTO". Moreover, the data file that is originally allowed to be deleted but is later found important can also be retransmitted to the server by utilizing the retransmission file.

While in the above-described embodiment, the "ART" process 1 (S110) and "ART" process 2 (S115) are successively executed, a simplified MFP or a system can be configured by employing only one of these two processes. Further, the "ART" process 2 may precede the "ART" process 1 if both process are performed.

In S205 of the flowchart in FIG. 3, parameter setting operations are performed using the operation panel 17. However, an equivalent input operation can be made on a software running on the PC 3A or 3B. To this effect, the user checks the parameter contents 18B to 18G with the PC and an operation equivalent to depression of the "START" key is performed on the PC 3B upon confirming that the desired parameters have been set. Then, the PC transmits to the MFP 1 the Scan-to-FTP execution request together with the parameters. As a result, judgment is made in S205 that the Scan-to-FTP execution request has been made.

In the above-described embodiment, the contents indicated by the profile are displayed as initial values or default settings in S205. However, modification may be made so that a part or all of the initial values or default settings are not displayed. In such a case, inputting the initial value or default setting is requisite for the parameters which do not have initial values or default settings, such as a password. Hence, by requesting the user to input the password, a high level security management can be accomplished.

Furthermore, description has been made so that in the process of S205, rewriting the parameter contents can be achieved through the operation on the operation panel 17. However, modification may be made so as not to allow a part or all of the parameters to be rewritten. With such a modified system, unauthorized or unintended change of the parameter can be prevented. Accordingly, accessing to unintentional server can be prevented and thus a high level security management can be accomplished.

In addition, the above-described embodiment shows an example in which the image data is uploaded to the servers connected to the MFP 1 via the LAN 3. However, the network may not only be a LAN but also be other types such as a WAN (Wide Area network).

In the above-described embodiment, the servers 2A to 2C are assumed to be FTP servers. However, the type of the communication protocol for use in transmitting and receiving image data is not restricted. Other types of servers operable with communication protocols other than FTP are also available in the invention. For example, so-called file servers, such as CIFS (Common Internet File System) servers, are available.

What is claimed is:

1. A data processing device comprising:
a communication section that is configured to be connectable to and communicable with one or more servers through a network;
a first storage section that stores a management table having a list of communication histories with respect to communications with each of the one or more servers, each communication history indicating a data file transmitted to a server;
a second storage section that stores data files transmitted to the one or more servers; and
a control section that is configured to judge, when the communication section is in communication with a server, whether or not a data file which has already been transmitted to the server needs to be retransmitted and retransmit the data file to the server upon retrieving the data file from the second storage section when judgment is made so that retransmission of the data file is needed;
wherein the control section judges that the data file needs to be retransmitted when the control section judges that the data file which has already been transmitted to the server is deleted therefrom;
wherein the communication history further indicates an instruction as to whether or not the data file needs to be retransmitted, and the control section retransmits the data file when the instruction indicates that the data file needs to be retransmitted; and
wherein the communication history further indicates a server to which the data file has already been retransmitted in relation to the data file.

2. The data processing device according to claim 1, wherein the control section is further configured to extract one or more communication histories indicating that the data file needs to be retransmitted and control the communication section to sequentially connect to one or more servers indicated in the extracted communication histories for retransmission of the data file.

3. The data processing device according to claim 1, wherein the communication history further indicates information about date and time when the data file has already been transmitted in relation to the server to which the data file is transmitted, and wherein the control section is further configured to rewrite the instruction indicated in the communication history so that the data file does not need to be retransmitted when the communication history indicates that an expiration period of time from the time when the data file is transmitted exceeds a predetermined period of time.

4. The data processing device according to claim 3, further comprising a data erasing section that is configured to erase a data file from the second storage section based on an expiration period of time from a time when the data file is transmitted.

5. The data processing device according to claim 1, further comprising a communication history recording section that records a communication history in the list of the communication histories of the management table each time a data file is transmitted to the server.

6. The data processing device according to claim 5, wherein the communication history recording section records information about date and time when the data file is transmitted to the server in relation to the data file transmitted and also to the server to which the data file is transmitted, and wherein the control section is further configured to extract a communication history in which a period of time expired from the date and time when the data file is transmitted to the server is within a predetermined period of time, and the communication section is further configured to connect to the server corresponding to the extracted communication history.

7. The data processing device according to claim 1, wherein the control section is further configured to control the second storage section to store at least a part of data files indicated in the list of the communication histories.

8. The data processing device according to claim 1, further comprising a scanner section configured to read an image of an object and produce a data file representing the image, wherein the control section is further configured to transmit the data file produced by the scanner section to a designated server.

9. The data processing device according to claim 8, wherein the control section is further configured to control the second storage section to store at least a part of data files produced by the scanner section.

10. The data processing device according to claim 1, further comprising a data erasing section that erases at least a part of the data files when the second storage section is in short of storage area for storing further data file.

11. A data processing device comprising:
a communication section that is configured to be connectable to and communicable with one or more servers through a network;
a first storage section that stores a management table having a list of communication histories with respect to communications with each of the one or more servers, each communication history indicating a data file transmitted to a server;
a second storage section that stores data files transmitted to the one or more servers; and
a control section that is configured to judge, when the communication section is in communication with a server, whether or not a data file which has already been transmitted to the server needs to be retransmitted and retransmit the data file to the server upon retrieving the data file from the second storage section when judgment is made that retransmission of the data file is needed,
wherein the control section judges that retransmission of the data file is needed when the control section finds a request for retransmitting the data file in the server, the request for retransmitting the data file being uploaded to the server before the control section judges whether or not the retransmission of the data file is needed.

12. The data processing device according to claim 11, wherein the request for retransmitting the data file is transmitted from the communication section to a server to which corresponding data file is transmitted.

13. The data processing device according to claim 12, wherein the request for retransmitting the data file is in a predetermined format and in a form of a text file.

14. A data processing device comprising:
a communication section that is configured to be connectable to and communicable with one or more servers through a network;
a first storage section that stores a management table having a list of communication histories with respect to communications with each of the one or more servers, each communication history indicating a data file transmitted to a server;
a second storage section that stores data files transmitted to the one or more servers;
a control section that is configured to judge, when the communication section is in communication with a server, whether or not a data file which has already been transmitted to the server needs to be retransmitted and retransmit the data file to the server upon retrieving the data file from the second storage section when judgment is made so that retransmission of the data file is needed; and
a data erasing section that erases at least a part of the data files when the second storage section is in short of storage area for storing further data file.

* * * * *